May 25, 1926.
J. M. HEINRICH
1,585,985
LUBRICATING ARRANGEMENT FOR MOTORS
Filed Nov. 25, 1924
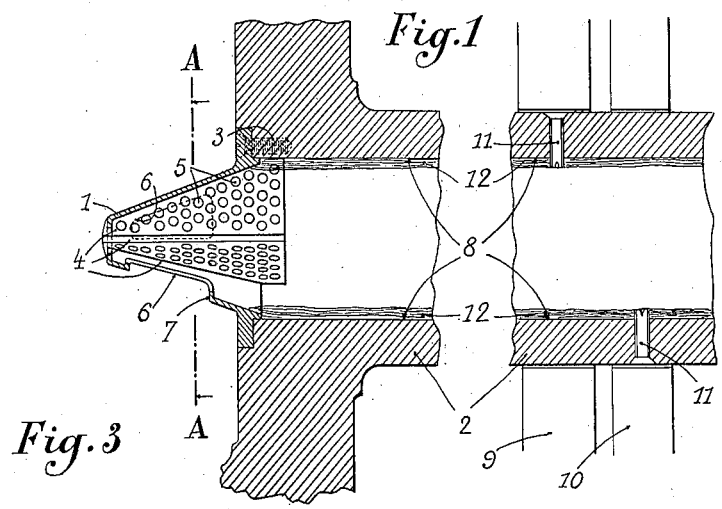
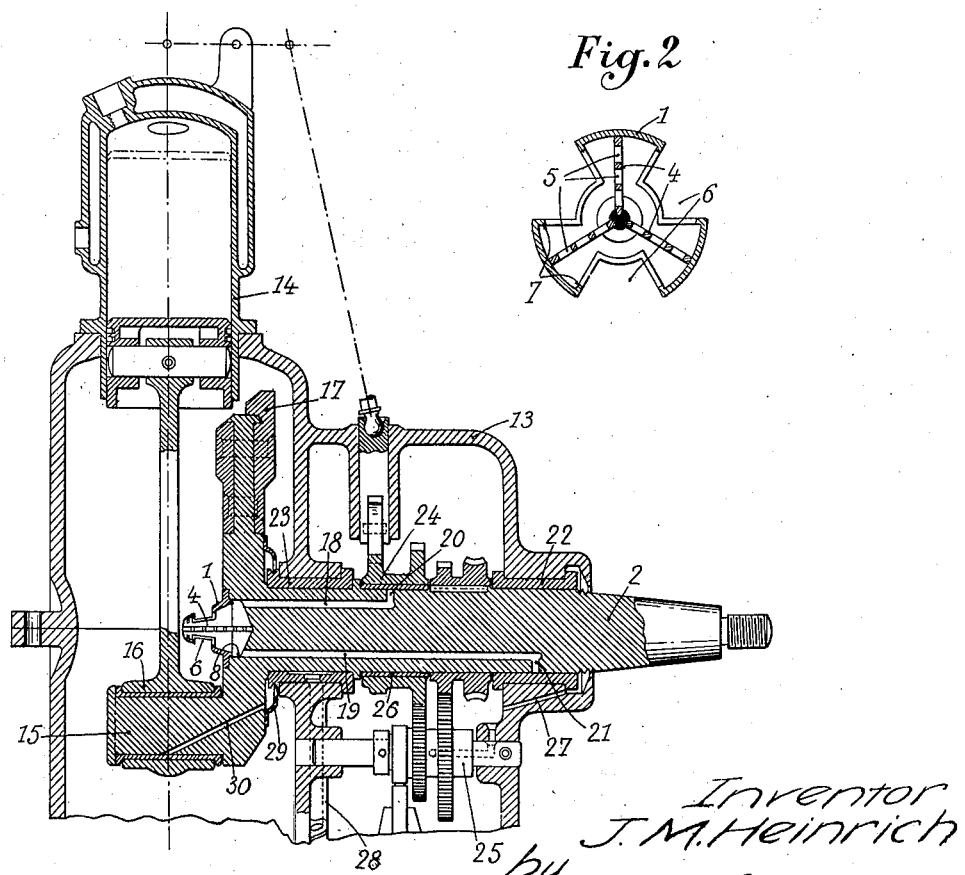

Patented May 25, 1926.

1,585,985

UNITED STATES PATENT OFFICE.

JEAN MARIE HEINRICH, OF PARIS, FRANCE, ASSIGNOR TO SOCIÉTÉ DES MOTEURS SALMSON (SYSTÈME CANTON-UNNÉ), OF PARIS.

LUBRICATING ARRANGEMENT FOR MOTORS.

Application filed November 25, 1924. Serial No. 752,219.

The present invention relates to an arrangement for the lubrication of the crankshaft and the elements which are journalled upon the said crankshaft in internal combustion engines. In said arrangement, advantage is taken of the presence in the crankcase of the engine when in operation of a cloud formed of oil drops which are in constant motion in all directions and it is chiefly characterized by the fact that it comprises an oil intake device secured to the end of the crankshaft and coaxial with the latter, and means for circulating the oil from the said intake to the elements to be lubricated. Other features will be set forth hereinafter.

In the appended drawings given by way of example:

Fig. 1 is a vertical section of the end of the crankshaft carrying the oil intake device according to the invention.

Fig. 2 is a section on a larger scale of the said oil intake, on the line A—A of Fig. 1.

Fig. 3 is a longitudinal section on the centre line of the crankshaft of an engine provided with the lubricating means in accordance with the invention.

The lubricating device according to the invention chiefly comprises an oil inlet consisting of a metallic nozzle 1 with thin walls and preferably of a tapered shape. The said nozzle is secured to the end of the crankshaft 2 and coaxially with the latter, for instance by means of the screws 3, and is provided in the interior with flat partitions 4 having therein a great number of perforations 5; said partitions are soldered or otherwise secured to the nozzle. The tapered wall of the nozzle is cut out so as to form large apertures 6, equal in number to the partitions 4, and alternating with the latter. During the operation of cutting out the apertures 6 in the lateral wall of the nozzle, a slight flange 7 is provided upon the periphery of the said apertures, and extends towards the centre of the nozzle.

The rear portion or base of the said nozzle fits within a cylindrical recess 8 which is coaxial with the crankshaft, the partitions 4 being preferably engaged in the said recess. As shown in Fig. 1, 9 and 10 are elements of the engine, shown diagrammatically, which are journalled upon the crank shaft and to which the lubricant is to be supplied, these being for example bearing surfaces ball-bearing, or the like. Cross-ducts 11 connect the recess 8 with the points to be lubricated.

The operation is as follows:

Under the effect of the whirls set up in the crankcase by the working of the engine, the drops of oil in suspension in the crankcase will enter the said nozzle and will be discharged through the apertures 6. But in order to proceed from one such aperture to another, the said cloud is obliged to pass through one of the partitions 4 and hence through the perforations 5 in the said partition; when passing through the said partitions, the cloud will yield up the major part of its drop and the latter will adhere to the surface of the partitions. The oil thus provided is drawn by centrifugal force along the partitions 4 as far as the inner periphery of the nozzle 1, and then along the said nozzle as far as the recess 8 in the crankshaft; the flanges 7 of the apertures 6 prevent the oil flowing along the said nozzzle from splashing to the outside through the said apertures, and the oil is obliged to flow around the said flanges. The oil collected in the recess 8 will form therein a cylinder 12 which is maintained by centrifugal force and extends as far as the inner end of the said recess. The oil which is taken off by the ducts 11 is supplied to the points to be lubricated under the effect of centrifugal force. The output may be adjusted in accordance with the dimensions and arrangement of the ducts.

It should be noted that the motion of the several parts of the engine causes variations in the pressure within the crankcase, and this produces a constant motion of the atmosphere within the recess 8 in the crankshaft, this latter movement improving the distribution of oil along the said recess.

On the other hand, the speed of rotation of the engines now employed upon motor vehicles or aeroplanes is such that the centrifugal action will have a sufficient value in order that an appreciable inclination, even for a long time, of the crankshaft relative to the horizontal, will not be prejudicial to the formation and maintenance of the cylinder of oil 12.

Fig. 3, which is a lengthwise section—simplified as far as possible—of a single cylinder stationary engine shows the use of the lubricating arrangement according to the invention, with a slight constructional modification; the reference numbers correspond to those of the preceding figures, and in addition, 13 is the crankcase carrying the cylinder 14; 15 is the crank pin engaging the piston rod head 16; the whole is balanced by means of the mass 17.

The oil intake nozzle 1 which is mounted at the end of the crankshaft 2 comprises only two lateral apertures 6, and the two partitions 4 are here formed by a single plate. The cylindrical recess 8 is formed in the crankshaft 2 only to a small depth; ducts 18 and 19 leading from the inner end of the recess 8 and parallel to the axis of the shaft 2 are connected at the outer ends to respective small transverse ducts 20 and 21 which communicate with the points to be lubricated. The shaft 2 rotates in the two bearings 22 and 23 which are carried by the crankcase 13. By way of example, 24 is the cam controlling a valve with a trip lever, not shown; the said cam is rotatable upon the shaft 2 and is actuated at one-half the speed of the said shaft by suitable gearing 25. The oil collected in the recess 8, as above mentioned, is circulated in the duct 18, as far as the transverse duct 20, thus lubricating the bearing surface of the sleeve 26 carrying the cam 24 upon the shaft 2; the oil also circulates in the duct 19 as far as the transverse duct 21 and thus lubricates the bearing 22. Obviously, the device may comprise any suitable number of ducts such as 18 and 19, these being tangent to the recess 8, in order to provide for the proper lubrication of the several parts of the engine.

For the lubrication of elements other than those which are directly mounted upon the crankshaft, the oil which is supplied to one of the latter elements may be utilized; it is observed for example in Fig. 3 that the oil discharged from the bearing 22 is taken up by a duct 27 which leads it to the bearing 25. In the present example, a single supply of oil under pressure 28 provides for the lubrication of the bearing 23; the oil discharged therefrom is circulated into a collecting trough 29, known per se, and carried by the crankshaft, whence it is circulated through the duct 30 to the crank pin 15 for the lubrication of the piston rod end 16; this latter may also be lubricated by splashing, and the journal 23 may be supplied with oil through the shaft 2 in the same manner as for the journal 22. In this event, no oil will be supplied under pressure, the arrangement shown in Fig. 3 being only intended to show that the lubricating means according to the invention may be combined in the same engine with other suitable means.

The lubricating arrangement according to the invention operates in an automatic manner, and the elements of the engine can thus be lubricated through the crankshaft, thus simplifying the question of lubrication to a considerable degree.

Obviously, the invention is not limited to the forms of construction hereinbefore described, these being given solely by way of example.

Having now described my invention, what I claim as new and desire to secure by Letters Patent is:

1. In a lubricating arrangement for engines the combination of a nozzle carried by the end cheek of the crankshaft and coaxial with said crankshaft, oil ducts formed through the crankshaft and opening on the one hand into said nozzle and on the other hand at the points to be lubricated, perforated longitudinal partitions within said nozzle and oil spray inlet and outlet apertures formed in the wall of said nozzle and in alternate disposition with said partitions.

2. In a lubricating arrangement for engines the combination of a tapered nozzle carried by the end cheek of the crankshaft and coaxial with said crankshaft, oil ducts formed through the crankshaft and opening on the one hand into said nozzle and on the other hand at the points to be lubricated, perforated longitudinal partitions within said nozzle and oil spray inlet and outlet apertures formed in the wall of said nozzle and in alternate disposition with said partitions.

3. In a lubricating arrangement for engines the combination of a tapered nozzle carried by the end cheek of the crankshaft and coaxial with said crankshaft, oil ducts formed through the crankshaft and opening on the one hand into said nozzle and on the other hand at the points to be lubricated, perforated longitudinal partitions within said nozzle and oil spray inlet and outlet apertures formed in the wall of said nozzle and in alternate disposition with said partitions and the edges of said apertures being formed with axial flanges extending towards the interior of said nozzle.

4. In a lubricating arrangement for engines the combination of an axial longitudinal bore through the crankshaft and opening in the end cheek of the latter, a nozzle fitting in said bore and protruding within the crankcase of the engine, ducts formed through the crankshaft and opening on the one hand into said bore and on the other hand, at the points to be lubricated, perforated longitudinal partitions within said nozzle and oil spray inlet and outlet apertures formed in the wall of said nozzle and in alternate disposition with said partitions.

5. In a lubricating arrangement for engines the combination of a recess provided in the end cheek of the crankshaft and coaxial with said crankshaft, longitudinal ducts through said crankshaft and opening into and tangent with said recess, radial ducts opening on the one hand into said longitudinal ducts and on the other hand at the points to be lubricated, a nozzle fitting in said recess and protruding within the crank-case of the engine, perforated longitudinal partitions within said nozzle and oil spray inlet and outlet apertures formed in the wall of said nozzle and in alternate disposition with said apertures.

In testimony whereof I have signed my name to this specification.

JEAN MARIE HEINRICH.